April 2, 1946. R. G. CUDINI 2,397,649
MACHINE FOR MAKING HINGES
Filed April 6, 1944 4 Sheets-Sheet 1
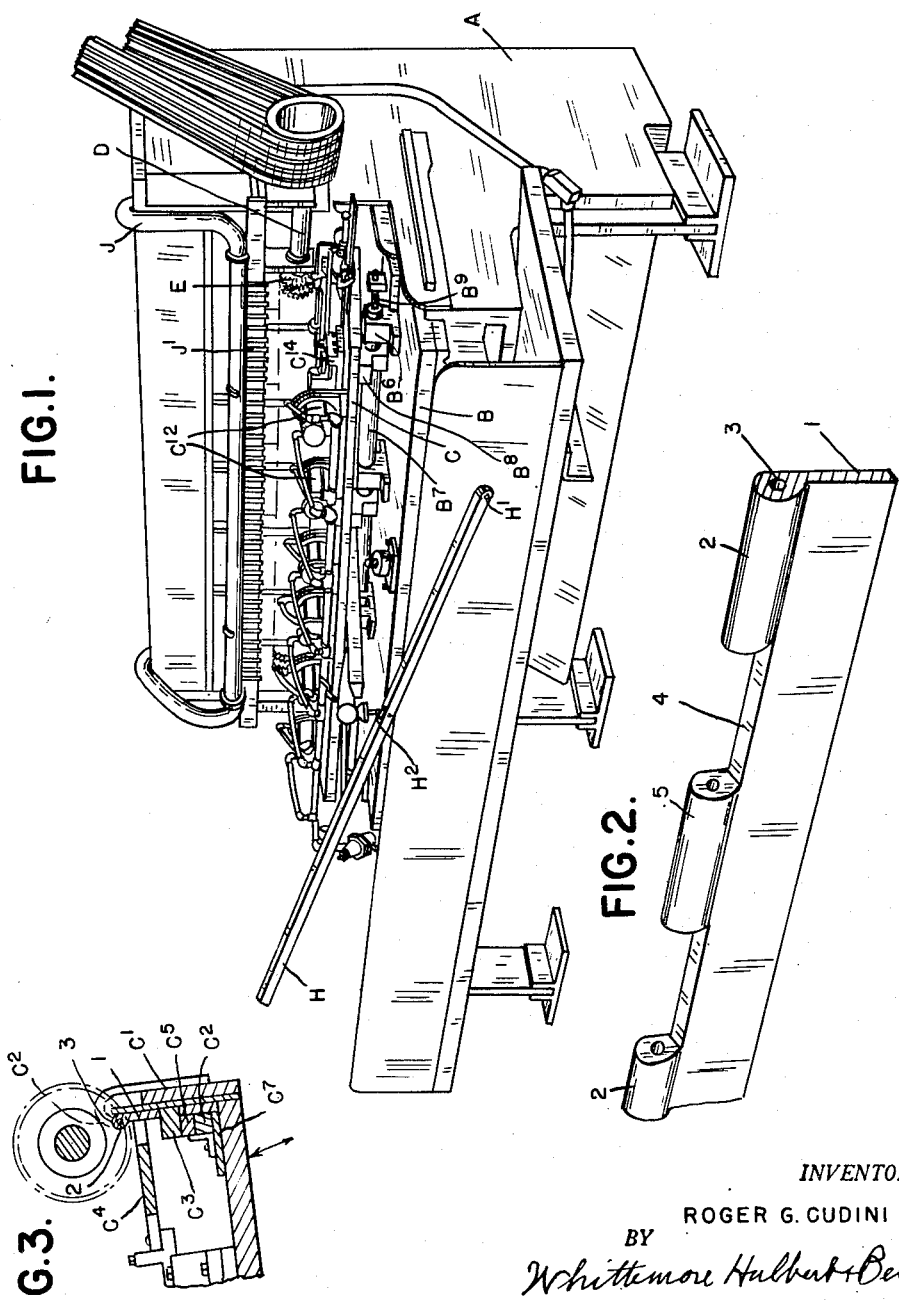
INVENTOR.
ROGER G. CUDINI
BY
Whittemore Hulbert+Belknap
ATTORNEYS April 2, 1946.  R. G. CUDINI  2,397,649
MACHINE FOR MAKING HINGES
Filed April 6, 1944  4 Sheets-Sheet 2

INVENTOR.
ROGER G. CUDINI
BY
*Whittemore Hulbert & Belknap*
ATTORNEYS

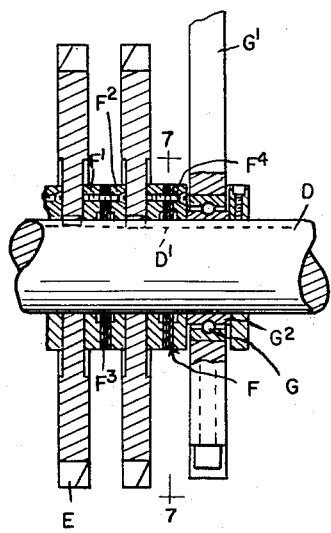
FIG.6.
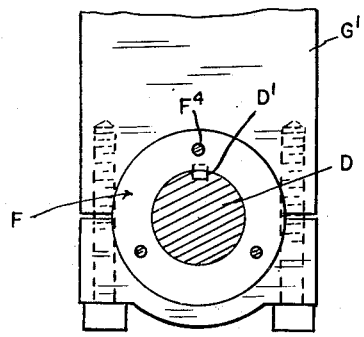
FIG.7.
FIG.8.
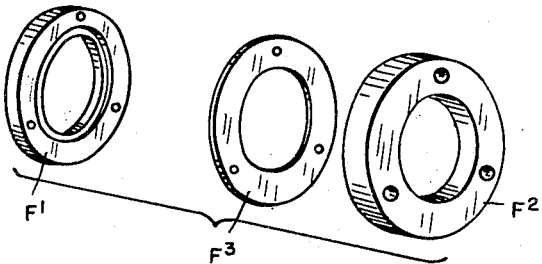
INVENTOR.
ROGER G. CUDINI
BY
Whittemore Hulbert + Belknap
ATTORNEYS April 2, 1946.   R. G. CUDINI   2,397,649
MACHINE FOR MAKING HINGES
Filed April 6, 1944   4 Sheets-Sheet 4

INVENTOR.
ROGER G. CUDINI
BY
Whittemore Hulbert + Belknap
ATTORNEYS

Patented Apr. 2, 1946

2,397,649

UNITED STATES PATENT OFFICE 2,397,649

MACHINE FOR MAKING HINGES

Roger G. Cudini, Birmingham, Mich., assignor to The Continuous Hinge Company, Northport, Mich., a limited co-partnership Application April 6, 1944, Serial No. 529,840

3 Claims. (Cl. 90—59)

The invention relates to the manufacture of hinges of the so-called "piano" type hinge. Such hinge construction includes a pair of strips each having an axially perforated bead extending along one edge thereof, said beads being cut away at spaced intervals for engagement with each other. The two strips are then connected by a rod or wire passed through the aligned perforations thereof. In one method of manufacture the beaded strips are formed by extrusion and, consequently, they may not be perfectly straight, or of absolutely uniform dimensions in all portions thereof. It is, however, essential that the interengaging bead portions of the strips should be in exact axial alignment so that the pivot rod or wire may be inserted therethrough. It is also essential that the bead portions of each strip should accurately fit the cut-away portions of the adjacent strip so as to close the space therebetween.

It is the object of the instant invention to obtain a construction of machine for cutting the beads of the extruded strips so that they will accurately fit each other as above described.

It is also an object to obtain a machine which will operate upon extruded strips of various dimensions and which may be quickly and easily adjusted when changing from one dimension to another.

Other important objects of the invention are to straighten the strips before cutting the beads thereof; to compensate for variations in thickness of the same strip; to change the dimension between centers of the cuts; to change the angle of the cut with respect to the plane of the strip; and to make other necessary adjustments according to the particular character of the hinge to be formed. With these objects in view, the invention consists in the general construction of the machine and various specific features of construction thereof as hereinafter set forth.

In the drawings:

Fig. 1 is a perspective view of the machine;

Fig. 2 is a perspective view of a portion of a bead strip after the completion of the cutting operation thereon;

Fig. 3 is a cross section through the arbor for the cutters and a portion of the holder for the work in relation to said arbor;

Fig. 6 is a sectional elevation showing a portion of the arbor, the supporting bearings therefor, and the cutters and spacers mounted thereon;

Fig. 7 is a cross section on line 7—7, Fig. 6;

Fig. 8 is a perspective view showing the several elements of the composite spacer;

Product formed by machine

Figure 4:
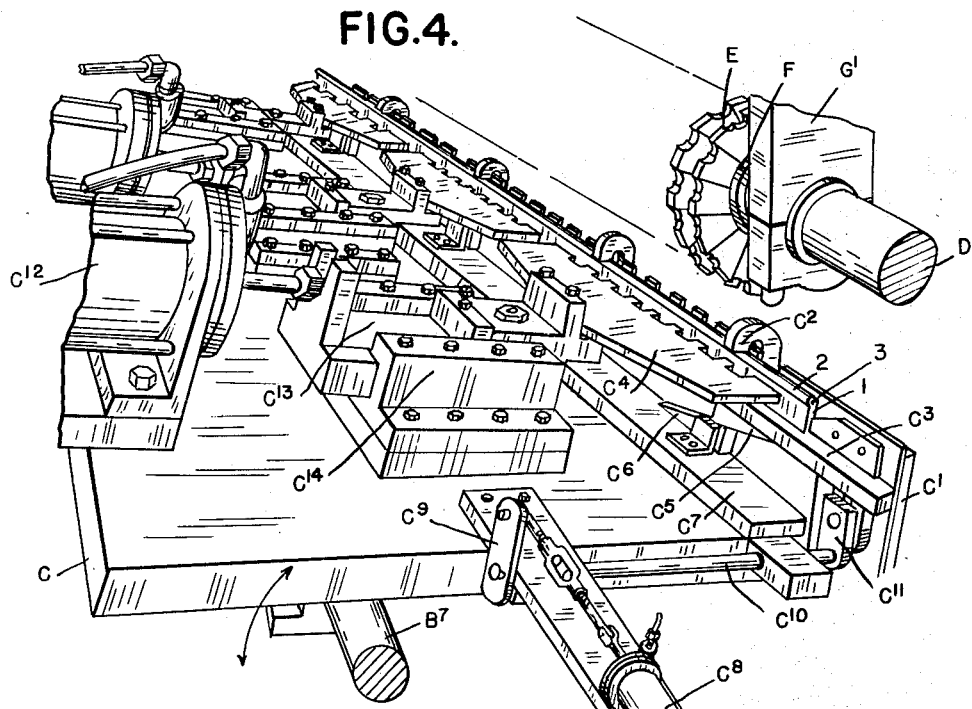
Fig. 4 is a perspective view of a portion of the work holder illustrating the means for straightening and clamping the extruded strip or blank in operative relation to the cutters.

The hinge section which is cut by the machine is illustrated in Fig. 2 in which 1 is the extruded strip, 2 is the beaded edge portion thereof which has the perforation 3 extending throughout the length thereof. In the original extruded blank this beaded edge is continuous but, as the result of the operation of the machine, portions of the bead are cut out as indicated at 4 leaving between said cut-outs lugs 5 of an equal length. Consequently, when two of said strips are placed together, the lugs of one will occupy the cut-outs of the other bringing the perforations in all of the lugs of both strips in alignment so that they may be connected by a pivot wire or rod passed therethrough.

Machine

In general construction my improved machine comprises a frame A on which is mounted a transversely adjustable carriage B having mounted thereon a tiltable work holding table C, the latter carrying the work clamping means. A revoluble arbor D is also mounted on the frame A in operative relation to the work on the tilting table C and on this arbor are the cutters E. These cutters must be exactly spaced from each other on the arbor to correspond in center to center distance with the center to center spacing between adjacent cut-away portions of the beaded strip. Such spacing is varied for different sizes of hinge strips and I have, therefore, provided means for effecting such variation which is of the following construction.

Adjustable cutters

As shown in Fig. 6, rotary milling cutters E have a spline engagement with the arbor D so as to permit of axial shifting the same. The width of each cutter is not greater than the minimum width of the cut-away portion of the bead and the distance between adjacent cutters is determined by intermediate spacers F. Instead of providing separate spacers for all the various adjustments that are necessary, I preferably employ a composite spacer such as illustrated in Fig. 8. This comprises annular members $F'$ and $F^2$ for direct contact with the cutters E and shim members $F^3$ arranged therebetween in multiples according to the dimension desired. All of these members are of an internal diameter for sleeving the same upon the arbor D and to hold the members together a plurality of clamping screws $F^4$ are used. As the width of the cutter in the portion thereof directly surrounding the arbor is a known dimension, it is only necessary to build up the spacers F to a complementary dimension to secure the desired spacing between centers. There are, however, bearings for supporting the arbor D at spaced points for which ball bearings G may be used, said bearings being mounted in hangers $G'$ depending from the upper portion of the frame A. The bearings G are preferably of a width not greater than the minimum width of space between adjacent cutters E and where the spacing between the cutters is greater than this minimum, complementary shims may be employed to obtain the required spacing. The inner race member $G^2$ of the bearing is slightly greater in width than the outer race member and hanger to provide clearance between the latter and the spacers or shims. Also, to permit of exact spacing between all of the cutters of a series, the hangers $G'$ are adjustably mounted on the frame A as by means of slotted flanges $G^3$ and clamping bolts $G^4$ passing through the slots. It is, therefore, possible with this construction to obtain exact center to center spacing of all of the cutters in the series.

*Strip straightening and holding means*

As before stated, the extruded strips 1 are not always straight or exactly uniform in dimensions in all portions thereof. Consequently, if such strips were clamped in their natural form and then moved into operative relation to the cutters, the depth of the cuts would not be uniform in all portions of the strip. To avoid such defect the holding means for the strips includes straight line abutting bearings for both the beaded edge of the strip and the flat side thereof, together with means for forcing the strip against such bearings prior to clamping the same. Such holding means illustrated in Figs. 3, 4 and 5 comprises a vertically extending flange $C'$ on the table C against which the flat side of the strip 1 is pressed and also a series of spaced narrow aligned bearings $C^2$ for contact with the beaded edge 2 which is arranged at the top. Beneath the strip 1 is a bar $C^3$ which is pressed upward against the lower edge of the strip forcing the beaded edge thereof into contact with all of the bearings $C^2$. All portions of the strip are pressed into contact with the flange $C'$ by a series of members $C^4$ bearing against the opposite side of the strip. The bar $C^3$ is moved upward by a longitudinal movement thereof and cooperating cams $C^5$ and $C^6$, respectively, on the underside of the bar and upon a supporting bar $C^7$ on the table C. The longitudinal movement of the bar $C^3$ is caused by an air cylinder $C^8$ which is connected to a crank $C^9$ on a rock shaft $C^{10}$, said shaft having a crank $C^{11}$ engaging a vertically slotted bearing on the bar $C^3$. The members $C^4$ are individually actuated by air cylinders $C^{12}$, the pistons of which are connected to slides $C^{13}$ movable in guideways $C^{14}$ on the table C and having their forward ends respectively attached to the member $C^4$. Thus, by the operation of the air cylinders $C^8$ and $C^{12}$, the strip 1 will be straightened and clamped against the bearings $C'$ and $C^2$.

*Positioning and operating means for the work holding table*

Figure 5:
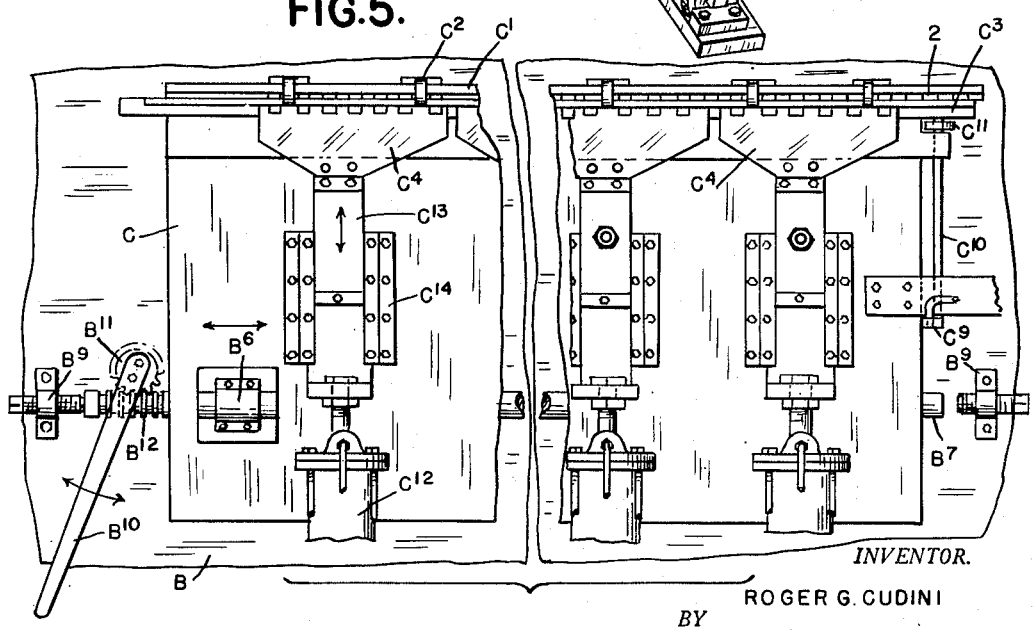
Fig. 5 is a plane view of the work holder clamping means and axial adjustment means.
Figure 10:
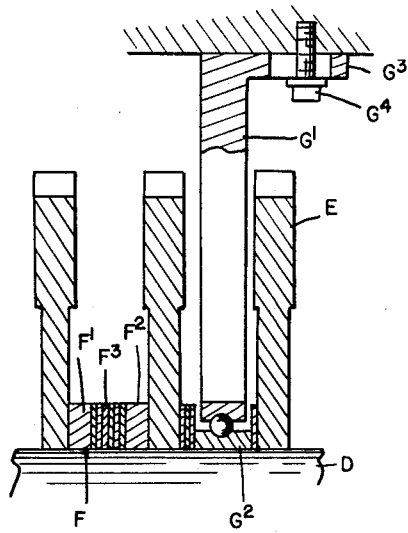
Fig. 10 is a view similar to a portion of Fig. 6.
Figure 9:
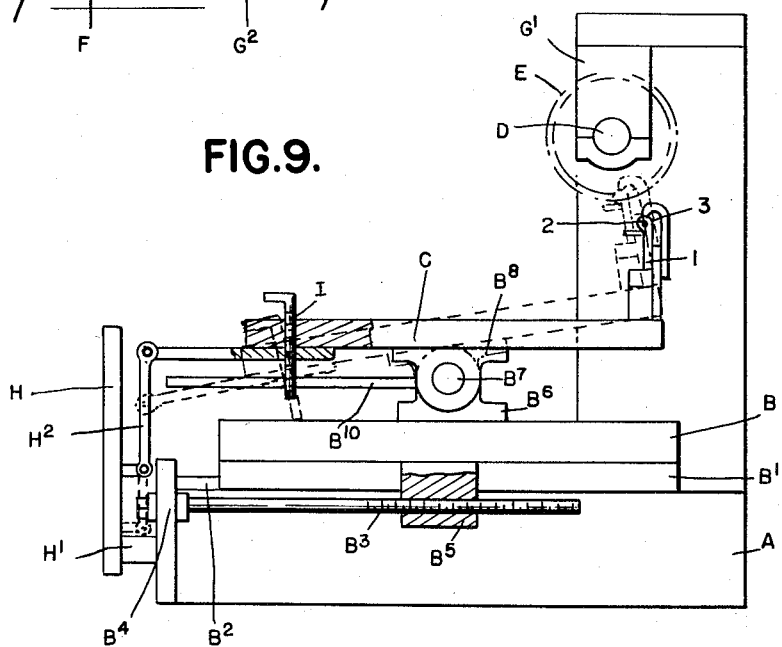
Fig. 9 is a cross section through the machine.

As previously stated, the table C is tiltably supported on the carriage B and the latter is movable on transverse ways on the supporting frame or bed A. By adjusting the carriage B, the clamped strip 1 may be moved into different relations with respect to the arbor D so that the cutters E in their operation will form the cut-outs at different angles to the plane of the strip. This is necessary for different designs of hinges. The actual contact of the work with the cutters is effected by a tilting of the table C. It is also necessary as will be hereinafter explained to move this table longitudinally so as to change the width of the cut-outs with respect to the width of the cutters which form the same. The detailed construction is illustrated in Figs. 1, 5 and 9 in which the carriage B has on its underside V-shaped bearings $B'$ for engaging corresponding V-shaped ways $B^2$ on the frame. Adjustment of this carriage is effected by a screw $B^3$ having its forward end swiveled at $B^4$ in the frame with its rear threaded portion engaging a threaded bearing $B^5$ on the underside of the carriage. Mounted in bearings $B^6$ on the carriage B is a longitudinally extending shaft $B^7$ which also engages bearings $B^8$ on the underside of the table C. The shaft $B^7$ is fixed in the bearings $B^8$ but is slidable in the bearings $B^6$ so that said shaft and table C may be moved longitudinally with respect to the carriage B. The amount of such movement is governed by adjustable screw-threaded stops $B^9$ at opposite ends of the shaft and mounted on the carriage. Movement of the shaft is effected by a lever $B^{10}$ for rotating a gear segment $B^{11}$ mounted on the carriage and engaging an annular rack 12 on the shaft $B^7$. Thus, the table C may be shifted by operation of the lever $B^{10}$ so that the cutters E will form cut-outs of greater width than the width of said cutters, such width being determined by the adjustments of the stops $B^9$. The rocking or tilting of the table is effected by a lever H which is fulcrumed at $H'$ on the frame A and is connected by a universally pivoted link $H^2$ to the forward edge of the table. When this lever is depressed, the rear edge portion of the table which carries the work clamp will be raised to move the work into engagement with the cutter. The amount of this upward movement is limited by an adjustable stop screw I on the table C which comes into contact with the carriage B.

*Operation*

In the setting of the machine for operation upon a specific hinge element, the cutters E on the arbor D are first properly spaced to correspond to the center to center spacing of the lugs 5 in the finished work. This is accomplished as before described by placing spacers between adjacent cutters which are of a complementary width to the width of the cutters to secure a desired center to center spacing. The spacers F are built up to the desired width by the insertion of a greater or lesser number of shims $F^3$ between the end member $F'$ and $F^2$ and then securing all together by the clamping screws $F^4$. Each of the cutters has a key or spline engaging a keyway $D'$ in the arbor D so as to rotatively couple the cutter to the arbor while permitting axial adjustment thereon. It may also be necessary to adjust the number of shims on one side of the bearings G to space the cutters on opposite sides of said bearings the required amount. Still further it may be necessary to adjust the positions of the hangers G' by loosening the bolts G⁴ in the slotted flanges G³ and then again clamping the bolts to hold the hanger in adjusted position. When all of these operations have been performed, the whole series of cutters on the arbor will be uniformly spaced in center to center distance therebetween which distance will correspond to the center to center spacing of the lugs 5 in the finished work. If the width of the cut-outs 4 is greater than the width of each of the cutters E, the stops B⁹ on the carriage are adjusted so that the amount of longitudinal movement permitted to the table C plus the width of the cutter E is equal to the desired width of the cut-out. This will be equal to the width of the lug 5 plus working clearance. The adjustment of the work holder to receive the extruded strip to be operated upon is accomplished by a longitudinal movement of the bar C³ and cam C⁵ thereon to move said bar away from the bearings C² sufficiently to receive the strip therebetween. Also, the members C⁴ are moved rearwardly to permit of inserting the strip between the same and the back bearing C'. Air is then supplied to the cylinders C⁸ and C¹², the first moving the bar C³ longitudinally and upwardly to engage the lower edge of the strip and clamp the beaded edge against the bearing C². Following this movement the members C⁴ are successively actuated by the cylinder C¹² to bear against the front face of the strip and to press all portions thereof into contact with the backing bearing C'. If the angle of the inner face of the cut-outs is to be changed, this is accomplished by adjusting the carriage forward or rearward with respect to the arbor D and by means of the adjusting screw B⁴. Also the depth of the cut-outs is regulated by adjusting the stop screw I which limits the tilting movement of the table C. When all of these adjustments have been made, the operator moves the table C against one of the stops B⁹ and by means of the lever B¹⁰, he then depresses the lever H which tilts the table bringing all of the cutters simultaneously into engagement with the beaded edge of the strip and cutting therein to a depth which has been predetermined by adjustment of the stop I. The lever is then raised and the table C adjusted by the lever B⁴ into contact with the opposite stop B⁹ after which the cutting operation is repeated. If the width of the cut-out is more than twice the width of the cutters, it may be necessary to adjust the table C into intermediate positions between the stops B⁹ for an additional operation of the cutters. After the completion of these operations, the air admitted to the cylinders C⁸ and C¹² is reversed by the operation of suitable valves (not shown) which releases the clamps to permit the withdrawal of the finished cut-out strip and the insertion of a new blank for a repetition of the operation. In case the length of the strip is greater than the length of the series of cutters, it will be necessary to adjust the strip longitudinally after one portion thereof has been operated upon and to repeat the operations upon another portion. A suitable gauge stop may be provided for indexing the second operation with respect to the first. While in the specific construction of machine above described, air cylinders and manually operated levers are included, any suitable operating means may be substituted therefor.

In the operation of the machine as above described, accuracy in dimensions of the finished product is dependent not only upon the original setup of the machine but also upon the temperature of the parts during the machining operations. For instance, heat generated by the cutting of the metal if not absorbed may raise the temperature of the strip so as to expand the same. The heat thus generated may also be communicated through the cutters to the arbor to cause expansion therein and alterations in dimensions. Consequently, it is essential that the strip operated upon, the holding means therefor, the cutters and the arbor should be maintained at some predetermined temperature to secure accuracy in the dimensions of the product. This I accomplish by the provision of cooling means which, as shown in Fig. 1, comprises a conduit J for a cooling fluid which extends longitudinally of the machine above the arbor and cutters. This conduit has a series of nozzles J' depending therefrom which discharge sprays of the cooling fluid over the cutters, arbor, strip operated upon and the clamping means therefor. The volume of fluid so discharged is sufficient to absorb all heat generated by the cutting operation and also to equalize the temperature in the several parts cooled. As a result, the strips successively cut by the machine will all be of the same dimensions when at the same temperature so that any strip will be engageable with any other strip.

What I claim as my invention is:

1. Means for straightening and holding workpieces of considerable length for machining operations thereon, comprising an elongated member having a plane face against which a surface of the workpiece is adapted to bear, spaced locating fingers projecting from said member and having locating surfaces adapted to be engaged by an edge of said workpiece, said locating surfaces defining a straight reference line, movable means disposed opposite to said locating surfaces adapted to engage an opposite edge of said workpiece and movable to position said first named edge against said locating surfaces, and movable means disposed opposite to said plane face at spaced points therealong and adapted to engage said workpiece at spaced points therealong to urge said workpiece against the plane face of the elongated member.

2. Means for straightening and holding workpieces of considerable length for machining operations thereon, comprising an elongated member having a plane face against which a surface of the workpiece is adapted to bear, spaced locating fingers projecting from said member and having locating surfaces adapted to be engaged by an edge of said workpiece, said locating surfaces overhanging said member and directed at substantially a right angle to said plane face, said locating surfaces defining a straight reference line, movable means disposed opposite to said locating surfaces adapted to engage an opposite edge of said workpiece and movable to position said first named edge against said locating surfaces, and movable means disposed opposite to said plane face at spaced points therealong and adapted to engage said workpiece at spaced points therealong to urge said workpiece against the plane face of the elongated member.

3. Means for straightening and holding workpieces of considerable length for machining operations thereon, comprising an elongated member having a plane face against which a surface of the workpiece is adapted to bear, spaced locating fingers projecting from said member and having locating surfaces adapted to be engaged by an edge of said workpiece, said locating surfaces overhanging said member and directed at substantially a right angle to said plane face, said locating surfaces defining a straight reference line, movable means disposed opposite to said locating surfaces adapted to engage an opposite edge of said workpiece and movable to position said first named edge against said locating surfaces, and a plurality of independently movable means disposed opposite to said plane face at spaced points therealong and adapted to engage said workpiece at spaced points therealong to urge said workpiece against the plane face of the elongated member.

ROGER G. CUDINI.